United States Patent
Akiba et al.

(10) Patent No.: US 10,759,709 B2
(45) Date of Patent: *Sep. 1, 2020

(54) DIELECTRIC COMPOSITION, DIELECTRIC ELEMENT, ELECTRONIC COMPONENT, AND MULTILAYER ELECTRONIC COMPONENT

(71) Applicant: TDK CORPORATION, Tokyo (JP)

(72) Inventors: Hiroki Akiba, Tokyo (JP); Sanshiro Aman, Tokyo (JP); Keiko Takeuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/087,884

(22) PCT Filed: Mar. 6, 2017

(86) PCT No.: PCT/JP2017/008804
§ 371 (c)(1),
(2) Date: Sep. 24, 2018

(87) PCT Pub. No.: WO2017/163844
PCT Pub. Date: Sep. 28, 2017

(65) Prior Publication Data
US 2019/0256425 A1    Aug. 22, 2019

(30) Foreign Application Priority Data
Mar. 24, 2016 (JP) .................. 2016-060420

(51) Int. Cl.
*C04B 35/495* (2006.01)
*H01G 4/12* (2006.01)
(Continued)

(52) U.S. Cl.
CPC ............ *C04B 35/495* (2013.01); *C04B 35/01* (2013.01); *C04B 35/6261* (2013.01);
(Continued)

(58) Field of Classification Search
CPC .... C04B 35/465; C04B 35/468; C04B 35/495
See application file for complete search history.

(56) References Cited

U.S. PATENT DOCUMENTS 5,668,694 A * 9/1997 Sato ................... B32B 18/00
257/295
10,354,799 B2 * 7/2019 Nomura ................ C04B 35/638
(Continued)

FOREIGN PATENT DOCUMENTS

JP    H11-224827 A    8/1999
JP    2014-001131 A    1/2014
(Continued)

OTHER PUBLICATIONS

Cao et al. "Crystal Structure and Ferroelectric Behaviors of Ba5SmTi3Ta7O30 and Ba4Sm2Ti4Ta6O30 Tungsten Bronze Ceramics." Journal of the American Ceramic Society, Mar. 2010, vol. 93, No. 3, pp. 782-786.
(Continued)

*Primary Examiner* — Karl E Group
(74) *Attorney, Agent, or Firm* — Oliff PLC

(57) ABSTRACT

A dielectric composition with high voltage resistance and favorable reliability, and an electronic component using the dielectric composition. The dielectric composition contains, as a main component, a tungsten bronze type composite oxide represented by a chemical formula $(Sr_{1.00-(s+t)}Ba_s Ca_t)_{6.00-x}R_x(Ti_{1.00-a}Zr_a)_{x+2.00}(Nb_{1.00-b}Ta_b)_{8.00-x}O_{30.00}$, in which the R is at least one element selected from Y, La, Pr, Nd, Sm, Eu, Gd, Tb, Dy, Ho, Er, Tm, Yb, and Lu, and s, t, x, a, and b satisfy $0.50 \leq s \leq 1.00$, $0 \leq t \leq 0.30$, $0.50 \leq s+t \leq 1.00$, (Continued)

$1.50 < x \leq 3.00$, $0.20 \leq a \leq 1.00$, and $0 \leq b \leq 1.00$. At least one selected from Mn, Mg, Co, V, W, Mo, Si, Li, B, and Al is contained as a sub component in 0.10 mol or more and 20.00 mol or less with respect to 100 mol of the main component.

6 Claims, 1 Drawing Sheet

(51) Int. Cl.
    *C04B 35/626*     (2006.01)
    *C04B 35/64*     (2006.01)
    *H01G 4/30*     (2006.01)
    *H01B 3/12*     (2006.01)
    *C04B 35/01*     (2006.01)
    *H01G 4/012*     (2006.01)
    *H01G 4/248*     (2006.01)

(52) U.S. Cl.
    CPC ............... *C04B 35/64* (2013.01); *H01B 3/12* (2013.01); *H01G 4/12* (2013.01); *H01G 4/1263* (2013.01); *H01G 4/30* (2013.01); *C04B 2235/3203* (2013.01); *C04B 2235/3206* (2013.01); *C04B 2235/327* (2013.01); *C04B 2235/3217* (2013.01); *C04B 2235/3239* (2013.01); *C04B 2235/3255* (2013.01); *C04B 2235/3256* (2013.01); *C04B 2235/3258* (2013.01); *C04B 2235/3262* (2013.01); *C04B 2235/3275* (2013.01); *C04B 2235/3409* (2013.01); *C04B 2235/3418* (2013.01); *C04B 2235/606* (2013.01); *C04B 2235/65* (2013.01); *H01G 4/012* (2013.01); *H01G 4/248* (2013.01)

(56) References Cited

U.S. PATENT DOCUMENTS

| 2008/0045399 | A1 | 2/2008 | Takeda et al. | |
|---|---|---|---|---|
| 2009/0105063 | A1* | 4/2009 | Luo | C04B 35/465 501/123 |
| 2018/0240594 | A1* | 8/2018 | Nomura | H01G 4/1227 |
| 2019/0112235 | A1* | 4/2019 | Akiba | C04B 35/495 |

FOREIGN PATENT DOCUMENTS

| WO | WO-2005075378 A1 * | 8/2005 | ........... C04B 35/495 |
|---|---|---|---|
| WO | 2006/114914 A1 | 11/2006 | |

OTHER PUBLICATIONS

Stennett et al. "Dielectric and structural studies of Ba2MTi2Nb3O15 (BMTNO15, M=Bi3+, La3+, Nd 3+, Sm3+, Gd3+) tetragonal tungsten bronze-structured ceramics." Journal of Applied Physics, May 29, 2007, vol. 101, pp. 104114-1-104114-7.

Sep. 25, 2018 International Preliminary Report on Patentability issued in International Patent Application No. PCT/JP2017/008804.

May 30, 2017 International Search Report issued in International Patent Application No. PCT/JP2017/008804.

Zhang et al. "Structural Evolving Sequence and Porous Ba6Zr2Nb8O30 Ferroelectric Ceramics with Ultrahigh Breakdown Field and Zero Strain." Journal of American Ceramic Society. vol. 96, No. 2, Nov. 1, 2012, pp. 555-560.

Zhu et al. "Ferroelectric phase transition and low-temperature dielectric relaxations in Sr4(La1—xSmx)2Ti4Nb6O30 ceramics." Journal of Applied Physics. American Institute of Physics, vol. 110, No. 11, Dec. 1, 2011, pp. 114101-1-114101-7.

Raju et al. "Effect of Zr substitution on structural, dielectric and electrical properties of Sr5SmTi3Nb7O30 ceramics." Materials Chemistry and Physics. vol. 99, No. 1, Sep. 10, 2006, pp. 135-143.

\* cited by examiner

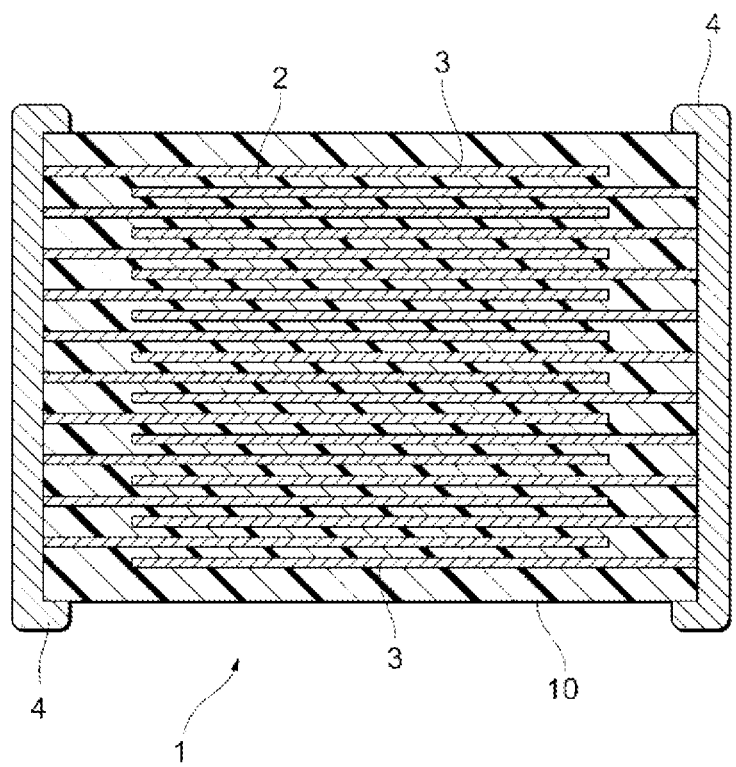

DIELECTRIC COMPOSITION, DIELECTRIC ELEMENT, ELECTRONIC COMPONENT, AND MULTILAYER ELECTRONIC COMPONENT

TECHNICAL FIELD

The present invention relates to a dielectric composition, a dielectric element, an electronic component, and a multilayer electronic component which are suitably used particularly under a high-temperature environment such as in-vehicle use.

BACKGROUND ART

For example, a multilayer ceramic capacitor is used in a variety of electronic equipment because of high reliability and low cost thereof. Specifically, the multilayer ceramic capacitor is used in information terminals, home electronics, automobile electronic components, and the like. In these use applications, particularly, in a multilayer ceramic capacitor for use application of in-vehicle use or the like, as compared to a typical multilayer ceramic capacitor, securement up to a higher-temperature region is required in some cases and higher reliability is necessary. It is necessary that the multilayer ceramic capacitor is not broken against a voltage to be applied, that is, has high voltage resistance. Further, since a high AC voltage is applied to a resonant capacitor used in a non-contact power supply resonant circuit or the like, the resonant capacitor is required to have high AC voltage resistance as well as high DC voltage resistance.

Patent document 1 discloses a technology relating to a tungsten bronze type composite oxide exhibiting a high specific permittivity and high specific resistance.

However, in the patent document 1, an alkali metal element is contained as a constituent element of a main component. Since the alkali metal element has high volatility, there is a problem in that handling at the time of manufacturing is prone to be cumbersome, for example, a process of filling an alkali metal element needs to be introduced in processes.

Further, since a lattice defect caused by potassium with high volatility easily occurs in the dielectric composition and thus a conduction electron is easily generated, there is a problem in that high DC voltage resistance is difficult to obtain.

Further, patent document 2 discloses a technology relating to a perovskite type oxide having high DC voltage resistance at 150° C.

However, since the perovskite type oxide has a low specific permittivity in a high-temperature region of 175° C. or higher that is expected to be used hereafter, there is a problem in that a desired capacitance is difficult to obtain.

Further, non-patent document 1 discloses a technology relating to a tungsten bronze type dielectric $Ba_2MTi_2Nb_3O_{15}$ (M=$Bi^{3+}$, $La^{3+}$, $Nd^{3+}$, $Sm^{3+}$, $Gd^{3+}$) with a high specific permittivity and a low dielectric loss. The tungsten bronze type dielectric has a high specific permittivity at room temperature of about 100 to 700 and a favorable value of tan δ at room temperature of 5% or less. In addition, non-patent document 2 discloses a technology relating to a tungsten bronze type dielectric $Ba_2Sm_2Ti_4Ta_6O_{30}$ with a high specific permittivity and a low dielectric loss. The tungsten bronze type dielectric has a high specific permittivity at room temperature of about 120 and a favorable value of tanδ at room temperature of 3% or less.

Further, regarding AC voltage resistance, patent document 3 discloses a technology of improving AC voltage resistance using a dielectric ceramic composition containing a compound represented by a composition formula $Ba_x(Ti_{1-y}Sn_y)O_3$ and an oxide of Zn. By strictly controlling the composition of the dielectric ceramic composition, a high specific permittivity, a low dielectric loss, and high AC voltage resistance are realized.

However, any of the patent documents and the non-patent documents do not mention dielectric properties, DC voltage resistance, and AC voltage resistance which are secured up to a high-temperature region of 175° C. or higher that is expected to be used hereafter. Further, in the patent document 3, since the invention is based on the assumption of a single-plate capacitor of about 1 mm, there is a problem in that necessary AC voltage resistance is not obtainable in a region in which the thickness of the dielectric layer is 10 μm or less like the multilayer ceramic capacitor. In particular, the magnitude of DC voltage resistance or AC voltage resistance is a property that is essential in a multilayer ceramic capacitor used for in-vehicle use, a non-contact power supply, or the like, and this is increasingly required with high breakdown voltage of an in-vehicle module in recent years.

CITATION LIST

Patent Document

Patent document 1: WO 2006/114914 A
Patent document 2: JP 11-224827 A
Patent document 3: JP 2014-1131 A

Non-Patent Document

Non-patent document 1: JOURNAL OF APPLIED PHYSICS 101, 104114 (2007) "Dielectric and structural studies of $Ba_2MTi_2Nb_3O_{15}$ ($BMTNO_{15}$, M=$Bi^{3+}$, $La^{3+}$, $Nd^{3+}$, $Sm^{3+}$, $Gd^{3+}$) tetragonal tungsten bronze-structured ceramics"

Non-patent document 2: Journal of the American Ceramic Society, 93[3] 782-786 (2010) "Crystal structure and ferroelectric behaviors of $Ba_5SmTi_3Ta_7O_{30}$ and $Ba_4Sm_2Ti_4Ta_6O_{30}$ tungsten bronze ceramics"

SUMMARY OF THE INVENTION

Problem to be Solved by the Invention

The present invention is made in view of the above-described problems, and aims to provide a dielectric composition which is suitably used under a high-temperature environment such as in-vehicle use, and has high AC voltage resistance and a low dielectric loss as well as high DC voltage resistance and high specific resistance even under an usage environment of 175° C. or higher, and a dielectric element, an electronic component, and a multilayer electronic component which use the dielectric composition.

Means for Solving Problem

In order to achieve the object, a dielectric composition of the present invention contains, as a main component, a tungsten bronze type composite oxide represented by a chemical formula $(Sr_{1.00-(s+t)}Ba_sCa_t)_{6.00-x}R_x(Ti_{1.00-a}Zr_a)_{x+2.00}(Nb_{1.00-b}Ta_b)_{8.00-x}O_{30.00}$, in which the R is at least one element selected from Y, La, Pr, Nd, Sm, Eu, Gd, Tb, Dy, Ho, Er, Tm, Yb, and Lu, and s, t, x, a, and b satisfy $0.50 \leq s \leq 1.00$, $0 \leq t \leq 0.30$, $0.50 \leq s+t \leq 1.00$, $1.50 < x \leq 3.00$, $0.20 \leq a \leq 1.00$, and $0 \leq b \leq 1.00$.

With the above-described dielectric composition, it is possible to obtain a dielectric composition which is suitably used under a high-temperature environment and has high AC voltage resistance and a low dielectric loss as well as high DC voltage resistance and high specific resistance.

Further, as a desirable embodiment of the present invention, at least one selected from Mn, Mg, Co, V, W, Mo, Si, Li, B, and Al is contained as a sub component in 0.10 mol or more and 20.00 mol or less with respect to 100 mol of the main component. Accordingly, a low dielectric loss is obtained in addition to higher specific resistance, higher DC voltage resistance, and higher AC voltage resistance.

As a desirable embodiment of the present invention, a substitution amount a of Zr contained in the main component is preferably $0.50 \leq a \leq 1.00$. Accordingly, it is possible not only to obtain higher DC voltage resistance but also to obtain higher AC voltage resistance and a lower dielectric loss.

A dielectric element according to the present invention preferably includes the above-described dielectric composition.

When the dielectric element according to the present invention includes the above-described dielectric composition, the dielectric element can be used under a high-temperature environment such as in-vehicle use.

An electronic component according to the present invention preferably includes a dielectric layer formed by the above-described dielectric composition.

A multilayer electronic component according to the present invention preferably includes a multilayer portion obtained by alternately stacking a dielectric layer formed by the above-described dielectric composition and an internal electrode layer.

When the electronic component and the multilayer electronic component according to the present invention include a dielectric layer formed by the above-described dielectric composition, the electronic component and the multilayer electronic component can be used under a high-temperature environment such as in-vehicle use.

The use application of the electronic component having a dielectric layer formed by the dielectric composition according to the present invention is not particularly limited, but the electronic component is useful for a multilayer ceramic capacitor, a piezoelectric element, a chip varistor, a chip thermistor, and the like.

EFFECT OF THE INVENTION

The present invention can provide a dielectric composition which is suitably used under a high-temperature environment such as in-vehicle use, and has high AC voltage resistance and a low dielectric loss as well as high DC voltage resistance and high specific resistance even under an usage environment of 175° C. or higher, and a dielectric element, an electronic component, and a multilayer electronic component which use the dielectric composition.

BRIEF DESCRIPTION OF DRAWINGS

FIGURE illustrates a cross-sectional view of a multilayer ceramic capacitor according to an embodiment of the present invention.

MODE(S) FOR CARRYING OUT THE INVENTION

Hereinafter, embodiments of the present invention will be described.

A dielectric composition according to the present embodiment contains, as a main component, a tungsten bronze type composite oxide represented by a chemical formula $(Sr_{1.00-(s+t)}Ba_sCa_t)_{6.00-x}R_x(Ti_{1.00-a}Zr_a)_{x+2.00}(Nb_{1.00-b}Ta_b)_{8.00-x}O_{30.00}$, in which the R is at least one element selected from Y, La, Pr, Nd, Sm, Eu, Gd, Tb, Dy, Ho, Er, Tm, Yb, and Lu, and s, t, x, a, and b satisfy $0.50 \leq s \leq 1.00$, $0 \leq t \leq 0.30$, $0.50 \leq s+t \leq 1.00$, $1.50 < x \leq 3.00$, $0.20 \leq a \leq 1.00$, and $0 \leq b \leq 1.00$.

When the dielectric composition according to the present embodiment contains, as a main component, a tungsten bronze type composite oxide represented by the chemical formula, high DC voltage resistance is easily obtained. Regarding the reason for this, the present inventors consider as follows. Since the tungsten bronze type composite oxide as the main component of the present embodiment has a characteristic that the bandgap is wide, electrons in the valence band are difficult to excite to the conduction band so that a carrier concentration of electrons that are a majority carrier involved in conduction can be suppressed. In addition, it is considered that the carrier concentration of conduction electrons that are a majority carrier affects electron avalanche that is a typical breakdown mode of the DC voltage resistance. In the dielectric composition of the present invention, since the carrier concentration of electrons that are a majority carrier can be suppressed to be low, it is considered that breakdown caused by electron avalanche is difficult to occur. Further, since the bandgap is wide, a certain degree of width of the bandgap can be maintained even when high field strength is applied. According to this, it is considered that high DC voltage resistance is easily obtained even in a high electric field. In addition, since an alkali metal with high volatility is not contained, a lattice defect is difficult to occur and conduction electrons are difficult to generate so that the dielectric composition of the present invention has a characteristic that the specific resistance and the DC voltage resistance are high.

When s and t in the chemical formula are $0.50 \leq s \leq 1.00$, $0 \leq t \leq 0.30$, and $0.50 \leq s+t \leq 1.00$, high DC voltage resistance and a low dielectric loss are easily obtained even under a high-temperature environment of 200° C. On the other hand, in a case where K, Na, or the like that is an alkali metal element is contained in addition to Sr, Ba, and Ca, since volatility of these alkali metal elements is high, a lattice defect easily occur by a heat treatment (such as firing process), and as a result, there is a tendency that high DC voltage resistance is difficult to obtain. In addition, t represents a substitution amount of Ca. Ca is an arbitrary component and an upper limit of the substitution amount thereof is 0.30.

When R in the chemical formula is at least one element selected from Y, La, Pr, Nd, Sm, Eu, Gd, Tb, Dy, Ho, Er, Tm, Yb, and Lu, high DC voltage resistance is easily obtained.

When a tungsten bronze type composite oxide in which x in the chemical formula is $1.50<x\leq3.00$, for example, which is represented by $(Sr_{1.00-(s+t)}Ba_sCa_t)_{4.00}R_{2.00}(Ti_{1.00-a}Zr_a)_{4.00}(Nb_{1.00-b}Ta_b)_{6.00}O_{30.00}$ in the case of x=2, $(Sr_{1.00-(s+t)}Ba_sCa_t)_{3.00}R_{3.00}(Ti_{1.00-a}Zr_a)_{5.00}(Nb_{1.00-b}Ta_b)_{5.00}O_{30.00}$ in the case of x=3, or the like is used as the main component, high AC voltage resistance and a low dielectric loss are easily obtained. The reason for this is considered that when rare earth is contained at a certain ratio or more in the main component of the tungsten bronze type composite oxide, bond strength between elements in the crystal, or the like changes to affect the dielectric loss. Further, it is considered that since the tungsten bronze type composite oxide of the chemical formula has a low dielectric loss in addition to a high bandgap, the followability of ion displacement with respect to the alternating electric field also becomes favorable and the AC voltage resistance becomes high.

On the other hand, in a case where x is more than 3.00, for example, in a composite oxide of a chemical formula $Ba_2La_4Zr_6Nb_4O_{30}$, or the like, the crystal structure of the tungsten bronze type is difficult to form so that it is difficult to obtain high AC voltage resistance that is a feature of the present invention.

When a substitution amount a of Zr in the chemical formula is $0.20\leq a\leq1.00$, the bandgap is widened, and thus high DC voltage resistance and a low dielectric loss are easily obtained.

Further, when the substitution amount a of Zr in the chemical formula is $0.50\leq a\leq1.00$, the bandgap is further widened, and thus high DC voltage resistance is easily obtained.

Ta in the chemical formula is an arbitrary component, and also in a composite oxide in which Nb is substituted with Ta, the crystal structure of the tungsten bronze type can be maintained. The substitution amount of Ta is preferably $0.10\leq b\leq1.00$, and accordingly, higher DC voltage resistance is easily obtained.

As the sub component, it is preferable that at least one or more elements selected from Mn, Mg, Co, V, W, Mo, Si, Li, B, and Al are contained. Owing to an interaction between Zr contained in the main component and these elements, high DC voltage resistance and high specific resistance are easily obtained. Preferably, when the substitution amount a of Zr is $0.80\leq a\leq1.00$, the interaction is enhanced so that higher DC voltage resistance is easily obtained.

Further, when the amount of the sub component is set to 0.10 mol or more and 20.00 mol or less with respect to 100 mol of the main component, a low dielectric loss of less than 0.20% can be obtained at 200° C. in addition to high specific resistance of $9.00\times10^{12}$ Ω/cm or more at 200° C. Moreover, higher DC voltage resistance can be obtained even at a high temperature of 175° C. or higher.

Further, other than R contained in the main component, at least one element selected from Y, La, Pr, Nd, Sm, Eu, Gd, Tb, Dy, Ho, Er, Tm, Yb, and Lu may be contained as a second sub component. The second sub component is an arbitrary component and an upper limit of the amount thereof is determined in a range within which the object of the invention can be achieved.

Incidentally, the dielectric composition may further contain fine impurities or other sub components as long as they do not largely deteriorate dielectric properties that are the effects of the present invention, that is, the specific permittivity, the specific resistance, the DC voltage resistance, and the AC voltage resistance. Therefore, the amount of the main component is not particularly limited, and for example, is 50 mol % or more and 100 mol% or less with respect to the whole dielectric composition containing the main component.

Next, description will be given using a multilayer ceramic capacitor as an example. Figure illustrates a multilayer ceramic capacitor according to an embodiment of the present invention. A multilayer ceramic capacitor 1 has a capacitor element main body 10 having a configuration in which a dielectric layer 2 and an internal electrode layer 3 are alternately stacked. A pair of external electrodes 4, which is conductive with each of the internal electrode layers 3 alternately disposed inside the element main body 10, is formed at both ends of the capacitor element main body 10. The shape of the capacitor element main body 10 is not particularly limited, and is typically a rectangular parallelepiped shape. In addition, the dimension thereof is also not particularly limited, and the dimension may be appropriately determined depending on the use application.

The thickness of the dielectric layer 2 is not particularly limited, and may be appropriately determined depending on the use application of the multilayer ceramic capacitor 1.

The conductive material contained in the internal electrode layer 3 is not particularly limited, and is preferably Ni, Pd, Ag, a Pd-Ag alloy, Cu, or a Cu-based alloy. Incidentally, a trace amount of various components such as P may be contained in about 0.1% by weight or less in Ni, Pd, Ag, a Pd—Ag alloy, Cu, or a Cu-based alloy. In addition, the internal electrode layer 3 may be formed using a commercially available paste for an electrode. The thickness of the internal electrode layer 3 may be appropriately determined depending on the use application or the like.

The conductive material contained in the external electrode 4 is not particularly limited, and Cu, a Cu-based alloy, Ni, a Ni-based alloy, Ag, an Ag—Pd alloy, and the like are typically used. The thickness of the external electrode may be appropriately determined depending on the use application or the like, and typically, is preferably about 5 µm to 50 µm. As necessary, a coating layer is formed on the surface of the external electrode by plating or the like.

Next, an example of a method for manufacturing the multilayer ceramic capacitor illustrated in FIGURE will be described.

The multilayer ceramic capacitor 1 of the present embodiment is manufactured by producing a green chip by a typical printing method or sheet method using a paste, firing the green chip, then applying an external electrode to the green chip, and firing the obtained product, similarly to a multilayer ceramic capacitor of the related art. Hereinafter, the manufacturing method will be described in detail.

An example of the method for manufacturing the multilayer ceramic capacitor according to the present embodiment will be described.

First, raw materials are prepared such that the main component has a desired proportion, and are mixed and heat-treated (calcined) at 800° C. or higher. Thus, calcined powder can be obtained. Preferably, a heat treatment is performed at 800° C. to 1000° C. such that the particle size of the calcined powder is 0.1 µm or more and 5.0 µm or less. It is preferable that a different phase such as $Ba_5Nb_4O_{15}$ having an anisotropic shape is not contained in the calcined powder.

Regarding the raw materials, an oxide mainly configured by Sr, Ba, Ca, Ti, Zr, Nb, Ta, Y, La, Pr, Nd, Sm, Eu, Gd, Tb, Dy, Ho, Er, Tm, Yb, or Lu, or a mixture thereof can be used as raw material powder. Moreover, the raw materials can be appropriately selected from various compounds that become the aforementioned oxide or composite oxide by firing, for example, carbonate, oxalate, nitrate, hydroxide, an organometallic compound, and the like and can be mixed for use. Specifically, SrO or $SrCO_3$ may be used as a raw material of Sr.

Further, in a case where the dielectric composition according to the present embodiment contains a sub component, a raw material of the sub component is also prepared. The raw material of the sub component is not particularly limited, and oxides of respective components or mixtures thereof can be used as raw material powder. Moreover, the raw materials can be appropriately selected from various compounds that become the aforementioned oxide or composite oxide by firing, for example, carbonate, oxalate, nitrate, hydroxide, an organometallic compound, and the like and can be mixed for use. Specifically, MgO or $MgCO_3$ may be used as a raw material of Mg.

The prepared calcined powder of the main components and the raw material of the sub component are weighed to have a predetermined compositional ratio and mixed, thereby obtaining a dielectric composition raw material. Examples of a mixing method include wet mixing performed using a ball mill and dry mixing performed using a dry mixer.

This dielectric composition raw material is prepared in the form of a coating material to prepare a paste for a dielectric layer. The paste for a dielectric layer may be an organic coating material obtained by kneading a dielectric raw material and an organic vehicle or may be an aqueous coating material.

The organic vehicle is obtained by dissolving a binder in an organic solvent. The binder used in the organic vehicle is not particularly limited, and may be appropriately selected from typical various binders such as ethylcellulose and polyvinyl butyral. The organic solvent to be used is also not particularly limited, and may be appropriately selected from various organic solvents such as terpineol, butyl carbitol, and acetone depending on a method to be used such as a printing method or a sheet method.

Further, in a case where the paste for a dielectric layer is produced in the form of an aqueous coating material, an aqueous vehicle obtained by dissolving a water-soluble binder, a dispersant, or the like in water and a dielectric raw material may be kneaded. The water-soluble binder used in the aqueous vehicle is not particularly limited, and for example, polyvinyl alcohol, cellulose, a water-soluble acrylic resin, and the like may be used.

A paste for an internal electrode layer is prepared by kneading the above-described organic vehicle with conductive materials formed from various conductive metals or alloys described above, various oxides, which become the above-described conductive material after firing, an organometallic compound, resinate, and the like.

A paste for an external electrode may be prepared in the similar manner to the paste for an internal electrode layer described above.

The amount of the organic vehicle in each paste described above is not particularly limited, and may be a typical amount, for example, the amount of the binder may be about 1% by weight to 5% by weight and the amount of the solvent may be about 10% by weight to 50% by weight. In addition, additives selected from various dispersants, plasticizers, dielectric materials, insulator materials, and the like may be contained in each paste as necessary. The total amount of these additives is set to preferably 10% by weight or less.

In the case of using a printing method, the paste for a dielectric layer and the paste for an internal electrode layer are printed on a substrate such as PET, stacked, cut in a predetermined shape, and then peeled off from the substrate to obtain a green chip.

Further, in the case of using a sheet method, a green sheet is formed using the paste for a dielectric layer, the paste for an internal electrode layer is printed on the green sheet, and then these are stacked to obtain a green chip.

The green chip is subjected to a binder removal treatment before firing described later. As binder removal conditions, a temperature increase rate is set to preferably 5° C./hr to 300° C./hr, a retention temperature is set to preferably 180° C. to 500° C., and a temperature retention time is set to preferably 0.5 hours to 24 hours. In addition, the atmosphere of the binder removal treatment is set to air or reductive atmosphere.

Further, the retention temperature at the time of firing is preferably 1000° C. to 1400° C. and more preferably 1100° C. to 1360° C. When the retention temperature is less than the above ranges, densification is not sufficient. When the retention temperature exceeds the above ranges, disconnection of the electrode by abnormal sintering of the internal electrode layer and deterioration in capacity change ratio by diffusion of an internal electrode layer constituent material easily occur. In addition, when the retention temperature exceeds the above ranges, there is a concern that dielectric particles coarsen to decrease DC voltage resistance.

As firing conditions other than the above firing conditions, in order to achieve uniform firing of a chip, the temperature increase rate is set to preferably 50° C./hr to 500° C./hr and more preferably 200° C./hr to 300° C./hr, and in order to control the particle diameter distribution after sintering within a range of 0.1 µm to 10.0 µm, the temperature retention time is set to preferably 0.5 hours to 24 hours and more preferably 1 hour to 3 hours, and the cooling rate is set to preferably 50° C./hr to 500° C./hr and more preferably 200° C./hr to 300° C./hr.

In the above-described binder removal treatment, for example, a wetter or the like may be used in wetting of $N_2$ gas, mixed gas, or the like. In this case, the water temperature is preferably about 5° C. to 75° C. In addition, the binder removal treatment, firing, and annealing may be performed consecutively or independently.

The capacitor element main body 10 obtained as described above is polished at the end faces thereof, for example, by barrel polishing, sandblasting, or the like and the paste for an external electrode is applied and fired, thereby forming the external electrode 4. Then, as necessary, a coating layer is formed on the surface of the external electrode 4 by plating or the like.

Hereinbefore, the embodiments of the present invention have been described. The present invention is not limited to the aforementioned embodiments, and can be variously modified in a range not departing from the gist of the present invention.

EXAMPLES

Hereinafter, the present invention will be described in more detail by means of specific examples of the present invention. The present invention is not limited to these examples. Incidentally, specimens marked with × in Table 2 are outside the range of the present invention.

As a raw material of the main component, each powder of $SrCO_3$, $BaCO_3$, $CaCO_3$, $TiO_2$, $ZrO_2$, $Nb_2O_5$, $Ta_2O_5$, $Bi_2O_3$, $Y_2O_3$, $La_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$ was prepared.

These materials were weighed to have the main component composition in Table 1, then wet-mixed with a ball mill, dried, and calcined at 800° C. to obtain calcined powder of the main component. A dielectric composition raw material was prepared. As a raw material of the sub component, each powder of $SiO_2$, MgO, $Co_2O_3$, $V_2O_5$, $WO_3$, $MoO_3$, MnO, $SiO_2$, $Li_2CO_3$, $B_2O_3$, $Al_2O_3$, and $Fe_3O_4$ was prepared and the main components and the sub components were mixed to respectively have a proportion in Table 1 to obtain dielectric composition raw materials of Specimen No. 1 to Specimen No. 65.

TABLE 1

| | 1.00 − (s + t) | s | t | Re | x | a | b | Accessory component [mol %] (with respect to 100 mol of main component) | | | | | | | | | | |
|---|---|---|---|---|---|---|---|---|---|---|---|---|---|---|---|---|---|---|
| | | | | | | | | Mg | Si | Co | V | W | Mo | Mn | Li | B | Al | Fe |
| Specimen No. 1 | 0.00 | 1.00 | 0.00 | La | 2.00 | 0.30 | 0.00 | — | — | — | — | — | — | — | — | — | — | — |
| Specimen No. 2 | 0.30 | 0.70 | 0.00 | La | 2.00 | 0.30 | 0.00 | — | — | — | — | — | — | — | — | — | — | — |
| Specimen No. 3 | 0.50 | 0.50 | 0.00 | La | 2.00 | 0.30 | 0.00 | — | — | — | — | — | — | — | — | — | — | — |
| Specimen No. 4 | 0.00 | 0.70 | 0.30 | La | 2.00 | 0.30 | 0.00 | — | — | — | — | — | — | — | — | — | — | — |
| Specimen No. 5 | 0.20 | 0.50 | 0.30 | La | 2.00 | 0.30 | 0.00 | — | — | — | — | — | — | — | — | — | — | — |
| X Specimen No. 6 | 0.30 | 0.40 | 0.30 | La | 2.00 | 0.30 | 0.00 | — | — | — | — | — | — | — | — | — | — | — |
| X Specimen No. 7 | 0.10 | 0.50 | 0.40 | La | 2.00 | 0.30 | 0.00 | — | — | — | — | — | — | — | — | — | — | — |
| X Specimen No. 8 | 0.00 | 0.50 | 0.50 | La | 2.00 | 0.30 | 0.00 | — | — | — | — | — | — | — | — | — | — | — |
| X Specimen No. 9 | 0.00 | 1.00 | 0.00 | La | 1.00 | 0.30 | 0.00 | — | — | — | — | — | — | — | — | — | — | — |
| Specimen No. 10 | 0.00 | 1.00 | 0.00 | La | 1.55 | 0.30 | 0.00 | — | — | — | — | — | — | — | — | — | — | — |
| Specimen No. 11 | 0.00 | 1.00 | 0.00 | La | 2.50 | 0.30 | 0.00 | — | — | — | — | — | — | — | — | — | — | — |
| Specimen No. 12 | 0.00 | 1.00 | 0.00 | La | 3.00 | 0.30 | 0.00 | — | — | — | — | — | — | — | — | — | — | — |
| X Specimen No. 13 | 0.00 | 1.00 | 0.00 | La | 4.00 | 0.30 | 0.00 | — | — | — | — | — | — | — | — | — | — | — |
| Specimen No. 14 | 0.00 | 1.00 | 0.00 | Y | 2.00 | 0.30 | 0.00 | — | — | — | — | — | — | — | — | — | — | — |
| Specimen No. 15 | 0.00 | 1.00 | 0.00 | Pr | 2.00 | 0.30 | 0.00 | — | — | — | — | — | — | — | — | — | — | — |
| Specimen No. 16 | 0.00 | 1.00 | 0.00 | Nd | 2.00 | 0.30 | 0.00 | — | — | — | — | — | — | — | — | — | — | — |
| Specimen No. 17 | 0.00 | 1.00 | 0.00 | Sm | 2.00 | 0.30 | 0.00 | — | — | — | — | — | — | — | — | — | — | — |
| Specimen No. 18 | 0.00 | 1.00 | 0.00 | Eu | 2.00 | 0.30 | 0.00 | — | — | — | — | — | — | — | — | — | — | — |
| Specimen No. 19 | 0.00 | 1.00 | 0.00 | Gd | 2.00 | 0.30 | 0.00 | — | — | — | — | — | — | — | — | — | — | — |
| Specimen No. 20 | 0.00 | 1.00 | 0.00 | Tb | 2.00 | 0.30 | 0.00 | — | — | — | — | — | — | — | — | — | — | — |
| Specimen No. 21 | 0.00 | 1.00 | 0.00 | Dy | 2.00 | 0.30 | 0.00 | — | — | — | — | — | — | — | — | — | — | — |
| Specimen No. 22 | 0.00 | 1.00 | 0.00 | Ho | 2.00 | 0.30 | 0.00 | — | — | — | — | — | — | — | — | — | — | — |
| Specimen No. 23 | 0.00 | 1.00 | 0.00 | Er | 2.00 | 0.30 | 0.00 | — | — | — | — | — | — | — | — | — | — | — |
| Specimen No. 24 | 0.00 | 1.00 | 0.00 | Tm | 2.00 | 0.30 | 0.00 | — | — | — | — | — | — | — | — | — | — | — |
| Specimen No. 25 | 0.00 | 1.00 | 0.00 | Yb | 2.00 | 0.30 | 0.00 | — | — | — | — | — | — | — | — | — | — | — |
| Specimen No. 26 | 0.00 | 1.00 | 0.00 | Lu | 2.00 | 0.30 | 0.00 | — | — | — | — | — | — | — | — | — | — | — |
| Specimen No. 27 | 0.00 | 1.00 | 0.00 | La, Sm | 2.00 | 0.30 | 0.00 | — | — | — | — | — | — | — | — | — | — | — |
| X Specimen No. 28 | 0.00 | 1.00 | 0.00 | Bi | 2.00 | 0.30 | 0.00 | — | — | — | — | — | — | — | — | — | — | — |
| X Specimen No. 29 | 0.00 | 1.00 | 0.00 | La | 2.00 | 0.00 | 0.00 | — | — | — | — | — | — | — | — | — | — | — |
| X Specimen No. 30 | 0.00 | 1.00 | 0.00 | La | 2.00 | 0.10 | 0.00 | — | — | — | — | — | — | — | — | — | — | — |
| Specimen No. 31 | 0.00 | 1.00 | 0.00 | La | 2.00 | 0.20 | 0.00 | — | — | — | — | — | — | — | — | — | — | — |
| Specimen No. 32 | 0.00 | 1.00 | 0.00 | La | 2.00 | 0.50 | 0.00 | — | — | — | — | — | — | — | — | — | — | — |

TABLE 1-continued

| | 1.00 − (s + t) | s | t | Re | x | a | b | Accessory component [mol %] (with respect to 100 mol of main component) | | | | | | | | | | |
|---|---|---|---|---|---|---|---|---|---|---|---|---|---|---|---|---|---|---|
| | | | | | | | | Mg | Si | Co | V | W | Mo | Mn | Li | B | Al | Fe |
| Specimen No. 33 | 0.00 | 1.00 | 0.00 | La | 2.00 | 0.80 | 0.00 | — | — | — | — | — | — | — | — | — | — | — |
| Specimen No. 34 | 0.00 | 1.00 | 0.00 | La | 2.00 | 1.00 | 0.00 | — | — | — | — | — | — | — | — | — | — | — |
| Specimen No. 35 | 0.00 | 1.00 | 0.00 | La | 2.00 | 0.30 | 0.05 | — | — | — | — | — | — | — | — | — | — | — |
| Specimen No. 36 | 0.00 | 1.00 | 0.00 | La | 2.00 | 0.30 | 0.10 | — | — | — | — | — | — | — | — | — | — | — |
| Specimen No. 37 | 0.00 | 1.00 | 0.00 | La | 2.00 | 0.30 | 0.50 | — | — | — | — | — | — | — | — | — | — | — |
| Specimen No. 38 | 0.00 | 1.00 | 0.00 | La | 2.00 | 0.30 | 1.00 | — | — | — | — | — | — | — | — | — | — | — |
| Specimen No. 39 | 0.00 | 1.00 | 0.00 | La | 2.00 | 0.30 | 0.00 | 0.05 | — | — | — | — | — | — | — | — | — | — |
| Specimen No. 40 | 0.00 | 1.00 | 0.00 | La | 2.00 | 0.30 | 0.00 | 0.10 | — | — | — | — | — | — | — | — | — | — |
| Specimen No. 41 | 0.00 | 1.00 | 0.00 | La | 2.00 | 0.30 | 0.00 | 1.00 | — | — | — | — | — | — | — | — | — | — |
| Specimen No. 42 | 0.00 | 1.00 | 0.00 | La | 2.00 | 0.30 | 0.00 | 10.00 | — | — | — | — | — | — | — | — | — | — |
| Specimen No. 43 | 0.00 | 1.00 | 0.00 | La | 2.00 | 0.30 | 0.00 | 20.00 | — | — | — | — | — | — | — | — | — | — |
| Specimen No. 44 | 0.00 | 1.00 | 0.00 | La | 2.00 | 0.30 | 0.00 | 30.00 | — | — | — | — | — | — | — | — | — | — |
| Specimen No. 45 | 0.00 | 1.00 | 0.00 | La | 2.00 | 0.30 | 0.00 | — | 1.00 | — | — | — | — | — | — | — | — | — |
| Specimen No. 46 | 0.00 | 1.00 | 0.00 | La | 2.00 | 0.30 | 0.00 | — | — | 1.00 | — | — | — | — | — | — | — | — |
| Specimen No. 47 | 0.00 | 1.00 | 0.00 | La | 2.00 | 0.30 | 0.00 | — | — | — | 1.00 | — | — | — | — | — | — | — |
| Specimen No. 48 | 0.00 | 1.00 | 0.00 | La | 2.00 | 0.30 | 0.00 | — | — | — | — | 1.00 | — | — | — | — | — | — |
| Specimen No. 49 | 0.00 | 1.00 | 0.00 | La | 2.00 | 0.30 | 0.00 | — | — | — | — | — | 1.00 | — | — | — | — | — |
| Specimen No. 50 | 0.00 | 1.00 | 0.00 | La | 2.00 | 0.30 | 0.00 | — | — | — | — | — | — | 1.00 | — | — | — | — |
| Specimen No. 51 | 0.00 | 1.00 | 0.00 | La | 2.00 | 0.30 | 0.00 | — | — | — | — | — | — | — | 1.00 | — | — | — |
| Specimen No. 52 | 0.00 | 1.00 | 0.00 | La | 2.00 | 0.30 | 0.00 | — | — | — | — | — | — | — | — | 1.00 | — | — |
| Specimen No. 53 | 0.00 | 1.00 | 0.00 | La | 2.00 | 0.30 | 0.00 | — | — | — | — | — | — | — | — | — | 1.00 | — |
| Specimen No. 54 | 0.00 | 1.00 | 0.00 | La | 2.00 | 0.30 | 0.00 | — | — | — | — | — | — | — | — | — | — | 1.00 |
| Specimen No. 55 | 0.00 | 1.00 | 0.00 | La | 2.00 | 0.30 | 0.00 | — | — | — | 3.00 | — | — | 3.00 | — | — | — | — |
| Specimen No. 56 | 0.00 | 1.00 | 0.00 | La | 2.00 | 0.30 | 0.00 | 5.00 | — | 1.00 | 1.00 | — | 0.05 | — | — | 10.00 | — | — |
| ✕Specimen No. 57 | 0.00 | 1.00 | 0.00 | La | 2.00 | 0.00 | 1.00 | 10.00 | — | — | — | — | — | — | — | — | — | — |
| Specimen No. 58 | 0.00 | 1.00 | 0.00 | Pr | 2.00 | 0.80 | 0.00 | 5.00 | — | — | — | — | — | — | — | — | — | — |
| Specimen No. 59 | 0.00 | 1.00 | 0.00 | Nd | 2.00 | 1.00 | 1.00 | — | — | — | — | — | — | — | — | 5.00 | — | — |
| Specimen No. 60 | 0.20 | 0.50 | 0.30 | Y | 1.55 | 0.20 | 0.00 | — | — | — | — | — | — | — | — | — | — | — |
| Specimen No. 61 | 0.20 | 0.50 | 0.30 | Y | 1.55 | 0.20 | 0.10 | — | — | — | — | — | — | — | — | — | — | — |
| Specimen No. 62 | 0.20 | 0.50 | 0.30 | Y | 1.55 | 0.20 | 0.00 | — | — | — | — | — | 1.00 | — | — | — | — | — |
| Specimen No. 63 | 0.00 | 1.00 | 0.00 | La | 2.00 | 0.30 | 0.00 | — | — | — | — | — | — | — | — | — | — | — |
| Specimen No. 64 | 0.20 | 0.50 | 0.30 | Y | 1.55 | 0.20 | 0.00 | — | — | — | — | — | — | — | — | — | — | — |
| Specimen No. 65 | 0.20 | 0.50 | 0.30 | Y | 1.55 | 0.20 | 0.10 | — | — | — | — | — | — | — | — | — | — | — |

"—" described in Table 1 indicates that a sub component is not contained.

The dielectric composition raw material thus obtained (100 parts by weight), a polyvinyl butyral resin (10 parts by weight), dioctyl phthalate (DOP) (5 parts by weight) as a plasticizer, and alcohol (100 parts by weight) as a solvent were mixed with a ball mill to obtain a paste, thereby producing a paste for a dielectric layer.

Apart from the above, Pd particles (44.6 parts by weight), terpineol (52 parts by weight), ethylcellulose (3 parts by weight), and benzotriazole (0.4 part by weight) were kneaded with a three-roll mill to obtain a slurry, thereby producing a paste for a Pd internal electrode layer. In addition, similarly to the paste for a Pd internal electrode layer, a paste for a Ni internal electrode layer was produced using Ni particles.

Then, a green sheet was formed using the produced paste for a dielectric layer on a PET film to have a thickness after drying of 7 μm. Subsequently, an internal electrode layer was printed with a predetermined pattern using the paste for an internal electrode layer on the green sheet, and then the sheet was peeled off from the PET film to produce a green sheet having an internal electrode layer. Incidentally, the green sheets each having an internal electrode layer were produced while the paste for a Pd internal electrode layer was used in the green sheets using Specimen No. 1 to Specimen No. 62 and the paste for a Ni internal electrode layer was used in the green sheets using Specimen No. 63 to Specimen No. 65. Subsequently, a plurality of green sheets having an internal electrode layer were stacked and adhered by pressure to obtain a green multilayer body. This green multilayer body was cut in a predetermined size to obtain a green chip.

Then, regarding the obtained green chip, Specimen No. 1 to Specimen No. 62 were subjected to a binder removal treatment in air (temperature increase rate: 10° C./hr, retention temperature: 400° C., temperature retention time: 8 hours, atmosphere: in air) and subjected to firing in air (temperature increase rate: 200° C./hr, retention temperature: 1000 to 1400° C., temperature retention time: 2 hours, cooling rate: 200° C./hr, atmosphere: in air), and Specimen No. 63 to Specimen No. 65 were subjected to a binder removal treatment in nitrogen (temperature increase rate: 10° C./hr, retention temperature: 350° C., temperature retention time: 8 hours, atmosphere: in nitrogen) and subjected to firing in reductive atmosphere (temperature increase rate: 200° C./hr, retention temperature: 1000° C. to 1400° C., temperature retention time: 2 hours, cooling rate: 200° C./hr, oxygen partial pressure: $10^{-9}$ to $10^{-12}$ Pa, atmosphere: $H_2$—$N_2$—$H_2O$ mixed gas). Thus, capacitor element main bodies were obtained.

The crystal structure of the dielectric layer of the obtained capacitor element main body was subjected to X-ray diffraction (XRD) measurement, and as a result, it was confirmed that the tungsten bronze type composite oxide was obtained. In addition, the composition of the dielectric composition in the dielectric layer of the obtained capacitor element main body was measured by inductively coupled plasma source mass spectrometry (ICP-MS), and as a result, it was confirmed that the composition in Table 1 was obtained.

The end faces of the obtained capacitor element main body were polished by sandblasting, and then an In—Ga eutectic alloy was applied as an external electrode to obtain multilayer ceramic capacitors of Specimen No. 1 to Specimen No. 65 having the same shape as the multilayer ceramic capacitor illustrated in FIGURE. The sizes of the obtained multilayer ceramic capacitors were all 3.2 mm×1.6 mm×1.2 mm, the thickness of the dielectric layer was set to 5.0 μm, the thickness of the internal electrode layer was set to 1.5 μm, and the number of the dielectric layers interposed between the internal electrode layers was set to 10.

The voltage resistance, the specific permittivity (εs), and the specific resistance of the obtained multilayer ceramic capacitors of Specimen No. 1 to Specimen No. 65 were measured by the following methods and presented in Table 2.

[Specific Permittivity (εs) and Dielectric Loss (tan δ)]

The capacitance C and the dielectric loss tan δ were measured for the multilayer ceramic capacitor at 25° C. and 200° C. by a digital LCR meter (4284A manufactured by YHP) at a frequency of 1 kHz with a signal, which has an input signal level (measurement voltage) of 1 Vrms, being input. Then, the specific permittivity εs (no unit of quantity required) was calculated on the basis of the thickness of the dielectric layer, the effective electrode area, and the capacitance C obtained as a result of the measurement. A higher specific permittivity was preferable and the specific permittivity of 300 or more was determined to be favorable. A lower dielectric loss at 200° C. that is the usage temperature environment to be assumed was preferable and the dielectric loss was determined to be favorable when the dielectric loss was 0.5% or less, more preferably 0.30% or less, and further preferably 0.20% or less.

[Specific Resistance]

Insulation resistance was measured for the multilayer ceramic capacitor specimen at 200° C. by a digital resistance meter (R8340 manufactured by ADVANTEST CORPORATION) under conditions of a measurement voltage of 30 V and a measurement time of 60 seconds. A value of specific resistance was calculated from the electrode area of the capacitor specimen and the thickness of the dielectric layer. Higher specific resistance was preferable, and the specific resistance was determined to be favorable when the specific resistance was $1.00 \times 10^{12}$ Ω/cm or more and more preferably $9.00 \times 10^{12}$ Ωcm or more. When the specific resistance is low, leak current increases in the capacitor and malfunction occurs in an electric circuit.

[Voltage Resistance]

A DC or AC voltage was applied to the multilayer ceramic capacitor specimen at 200° C. at a pressure increase rate of 100 V/sec, and a case where leak current exceeds 10 mA was regarded as DC or AC voltage resistance. Higher DC voltage resistance was preferable, and the DC voltage resistance was determined to be favorable when the DC voltage resistance was 150 V/μm or more, more preferably 160 V/μm or more, and further preferably 175 V/μm or more. In addition, higher AC voltage resistance was preferable, and the AC voltage resistance was determined to be favorable when the AC voltage resistance was 45.0 V/μm or more, more preferably 50.0 V/μm or more, and further preferably 65.0 V/μm or more.

TABLE 2

|  | 25° C. Specific permittivity [-] | 25° C. Dielectric loss [%] | 200° C. Dielectric loss [%] | 200° C. Specific resistance [Ωcm] | 200° C. AC voltage resistance [V/μm] | 200° C. DC voltage resistance [V/μm] |
| --- | --- | --- | --- | --- | --- | --- |
| Specimen No. 1 | 338 | 0.47 | 0.39 | 7.73E+12 | 54.7 | 166 |
| Specimen No. 2 | 335 | 0.62 | 0.39 | 7.78E+12 | 54.6 | 165 |
| Specimen No. 3 | 325 | 0.83 | 0.37 | 7.75E+12 | 54.2 | 162 |
| Specimen No. 4 | 333 | 0.53 | 0.34 | 7.71E+12 | 54.3 | 161 |
| Specimen No. 5 | 331 | 0.71 | 0.42 | 7.67E+12 | 53.3 | 162 |
| ✕Specimen No. 6 | 330 | 0.76 | 0.87 | 7.48E+12 | 36.1 | 156 |
| ✕Specimen No. 7 | 327 | 0.68 | 0.79 | 7.62E+12 | 36.9 | 162 |
| ✕Specimen No. 8 | 329 | 0.72 | 0.61 | 7.69E+12 | 43.1 | 162 |
| ✕Specimen No. 9 | 437 | 4.87 | 0.57 | 6.17E+12 | 42.8 | 165 |
| Specimen No. 10 | 356 | 1.21 | 0.42 | 6.56E+12 | 53.5 | 167 |
| Specimen No. 11 | 339 | 0.47 | 0.38 | 7.63E+12 | 55.3 | 169 |
| Specimen No. 12 | 325 | 0.44 | 0.36 | 7.59E+12 | 55.8 | 168 |
| ✕Specimen No. 13 | — | — | — | — | — | — |
| Specimen No. 14 | 336 | 1.38 | 0.35 | 7.69E+12 | 54.6 | 165 |
| Specimen No. 15 | 335 | 1.23 | 0.38 | 7.75E+12 | 54.2 | 164 |
| Specimen No. 16 | 337 | 1.67 | 0.35 | 7.67E+12 | 54.5 | 166 |
| Specimen No. 17 | 340 | 1.93 | 0.36 | 7.65E+12 | 54.4 | 164 |
| Specimen No. 18 | 338 | 1.98 | 0.33 | 7.60E+12 | 54.4 | 165 |
| Specimen No. 19 | 344 | 2.18 | 0.35 | 7.70E+12 | 54.6 | 166 |
| Specimen No. 20 | 337 | 2.11 | 0.32 | 7.67E+12 | 54.3 | 164 |
| Specimen No. 21 | 335 | 1.96 | 0.34 | 7.62E+12 | 54.5 | 167 |
| Specimen No. 22 | 336 | 2.03 | 0.31 | 7.61E+12 | 54.2 | 163 |
| Specimen No. 23 | 338 | 2.05 | 0.34 | 7.68E+12 | 54.1 | 165 |
| Specimen No. 24 | 335 | 2.05 | 0.33 | 7.64E+12 | 53.9 | 162 |
| Specimen No. 25 | 340 | 2.08 | 0.31 | 7.59E+12 | 54.2 | 166 |
| Specimen No. 26 | 337 | 2.14 | 0.32 | 7.58E+12 | 54.0 | 165 |
| Specimen No. 27 | 340 | 0.86 | 0.34 | 7.71E+12 | 54.5 | 167 |
| ✕Specimen No. 28 | 336 | 2.13 | 0.39 | 7.62E+12 | 52.8 | 129 |
| ✕Specimen No. 29 | 346 | 0.52 | 0.46 | 5.45E+11 | 42.1 | 136 |
| ✕Specimen No. 30 | 344 | 0.51 | 0.44 | 3.18E+12 | 43.7 | 162 |
| Specimen No. 31 | 341 | 0.47 | 0.37 | 4.23E+12 | 52.3 | 164 |
| Specimen No. 32 | 335 | 0.42 | 0.28 | 8.09E+12 | 66.2 | 176 |
| Specimen No. 33 | 329 | 0.41 | 0.27 | 9.58E+12 | 66.4 | 177 |
| Specimen No. 34 | 327 | 0.37 | 0.27 | 1.54E+13 | 66.5 | 179 |
| Specimen No. 35 | 333 | 0.45 | 0.28 | 7.79E+12 | 65.7 | 165 |
| Specimen No. 36 | 328 | 0.43 | 0.25 | 8.01E+12 | 66.2 | 171 |
| Specimen No. 37 | 314 | 0.34 | 0.24 | 8.15E+12 | 66.5 | 173 |
| Specimen No. 38 | 309 | 0.25 | 0.24 | 9.09E+12 | 66.7 | 174 |
| Specimen No. 39 | 339 | 0.27 | 0.26 | 8.13E+12 | 57.3 | 169 |
| Specimen No. 40 | 336 | 0.18 | 0.16 | 9.35E+12 | 65.6 | 177 |
| Specimen No. 41 | 337 | 0.17 | 0.15 | 9.63E+12 | 66.2 | 185 |
| Specimen No. 42 | 334 | 0.18 | 0.15 | 9.47E+12 | 65.9 | 184 |
| Specimen No. 43 | 329 | 0.16 | 0.17 | 9.45E+12 | 65.9 | 183 |
| Specimen No. 44 | 328 | 0.23 | 0.25 | 8.59E+12 | 58.0 | 170 |
| Specimen No. 45 | 336 | 0.19 | 0.15 | 9.29E+12 | 65.6 | 183 |
| Specimen No. 46 | 335 | 0.21 | 0.17 | 9.05E+12 | 65.9 | 184 |
| Specimen No. 47 | 337 | 0.18 | 0.16 | 9.22E+12 | 65.7 | 182 |
| Specimen No. 48 | 333 | 0.17 | 0.16 | 9.17E+12 | 65.7 | 181 |
| Specimen No. 49 | 334 | 0.20 | 0.15 | 9.19E+12 | 65.8 | 182 |
| Specimen No. 50 | 339 | 0.18 | 0.17 | 9.43E+12 | 66.1 | 186 |
| Specimen No. 51 | 332 | 0.24 | 0.18 | 9.38E+12 | 65.7 | 184 |
| Specimen No. 52 | 341 | 0.19 | 0.17 | 9.51E+12 | 66.0 | 188 |
| Specimen No. 53 | 330 | 0.17 | 0.15 | 9.46E+12 | 66.2 | 187 |
| Specimen No. 54 | 334 | 0.45 | 0.27 | 5.47E+12 | 55.3 | 167 |
| Specimen No. 55 | 335 | 0.17 | 0.16 | 9.22E+12 | 66.1 | 185 |
| Specimen No. 56 | 336 | 0.17 | 0.18 | 9.49E+12 | 65.8 | 187 |
| ✕Specimen No. 57 | 316 | 0.31 | 0.42 | 5.27E+11 | 42.5 | 128 |
| Specimen No. 58 | 335 | 0.61 | 0.09 | 1.65E+13 | 68.4 | 203 |
| Specimen No. 59 | 307 | 0.72 | 0.07 | 1.86E+13 | 68.6 | 209 |
| Specimen No. 60 | 348 | 1.31 | 0.39 | 2.72E+12 | 47.6 | 152 |
| Specimen No. 61 | 341 | 1.26 | 0.27 | 3.16E+12 | 53.1 | 164 |
| Specimen No. 62 | 347 | 0.65 | 0.18 | 9.48E+12 | 65.3 | 177 |
| Specimen No. 63 | 336 | 0.48 | 0.38 | 7.37E+12 | 54.2 | 169 |
| Specimen No. 64 | 339 | 1.35 | 0.39 | 1.58E+12 | 47.3 | 151 |
| Specimen No. 65 | 344 | 1.25 | 0.25 | 2.79E+12 | 53.2 | 166 |

"—" described in Table 2 indicates "unmeasurable."

As presented in Table 2, the multilayer ceramic capacitor specimens in which the amounts s and t, and 1.00−(s+t) of Ba, Ca, and Sr as the main components are respectively 0.50≤s≤1.00, 0.00≤t≤0.30, and 0.50≤s+t≤1.00 have high DC voltage resistance and high AC voltage resistance at 200° C.

As presented in Table 2, the multilayer ceramic capacitor specimens in which the substitution amount x of R as the main component is 1.50<x≤3.00 have a low dielectric loss at 200° C. of 0.5% or less and high AC voltage resistance at 200° C. In the case of Specimen No. 13 in which x>3.00 is satisfied, the main component is difficult to synthesize.

As presented in Table 2, the multilayer ceramic capacitor specimens in which R as the main component is at least one element selected from Y, La, Pr, Nd, Sm, Eu, Gd, Tb, Dy, Ho, Er, Tm, Yb, and Lu have high DC voltage resistance and high AC voltage resistance at 200° C.

As presented in Table 2, the multilayer ceramic capacitor specimens in which the substitution amount a of Zr as the main component is 0.20≤a≤1.00 have high DC voltage resistance and high AC voltage resistance at 200° C. Of these, in the case of the multilayer ceramic capacitor specimens in which 0.50≤a≤1.00 is satisfied, the DC voltage resistance at 200° C. becomes higher. Specimen No. 29 in which a=0 is satisfied has low specific resistance at 200° C. and low DC voltage resistance at 200° C.

As presented in Table 2, also in Specimen No. 35 to Specimen No. 38 in which Nb as the main component is substituted with Ta, the DC voltage resistance and the AC voltage resistance at 200° C. are high, and in the case of Specimen No. 36 to Specimen No. 38 in which the substitution amount b of Ta is set to 0.10≤b≤1.00, the DC voltage resistance and the AC voltage resistance at 200° C. are higher.

As presented in Table 2, the multilayer ceramic capacitor specimens in which the molar quantity of the sub component with respect to 100 mol of the main component is 0.10 mol≤the sub component≤20.00 mol have higher specific resistance at 200° C.

As presented in Table 2, the multilayer ceramic capacitor specimens in which at least one selected from Mn, Mg, Co, V, W, Mo, Si, Li, B, and Al is contained as a sub component have higher specific resistance at 200° C.

Also in Specimen No. 63 to Specimen No. 65 produced using a Ni internal electrode by reductive atmosphere firing, it is possible to confirm that the specific resistance, the DC voltage resistance, and the AC voltage resistance at 200° C. exhibit high values.

Comparative Example

In Specimen No. 66 and Specimen No. 67 presented in Table 3, multilayer ceramic capacitors were produced using a tungsten bronze type composite oxide containing an alkali metal element as a main component. The specific manufacturing method will be described below. Incidentally, a specimen marked with × in Table 3 is a comparative example.

In Specimen No. 66 and Specimen No. 67, tungsten bronze type composite oxide $K(Sr_{0.3}Ba_{0.3}Ca_{0.04})_2Nb_5O_{15}$ powder containing an alkali metal element synthesized in advance was prepared as a main component, and $MnCO_3$ powder that is a raw material of a sub component to be added to the main component was prepared. Then, $K(Sr_{0.3}Ba_{0.3}Ca_{0.4})_2Nb_5O_{15}$ powder as the main component and $MnCO_3$ powder as the raw material of the sub component were weighed and mixed to have a predetermined ratio of the sub component to 100 mol of the main component, thereby preparing mixed powder.

The mixed powder of the main component and the sub component is used as a dielectric composition raw material.

A paste for a dielectric layer was produced in the similar manner to the example, except that the dielectric composition raw material was used, and a green sheet was formed on a PET film to have a thickness after drying of 7 µm. Then, an internal electrode layer was printed with a predetermined pattern on the green sheet using a paste for an internal electrode containing Ni as a main component, and then the sheet was peeled off from the PET film to produce a green sheet having an internal electrode layer. Subsequently, a green chip was obtained using the green sheet similarly to the example.

Then, the obtained green chip was subjected to a binder removal treatment (temperature increase rate: 10° C./hr, retention temperature: 350° C., temperature retention time: 8 hours, atmosphere: in nitrogen) and subjected to firing (temperature increase rate: 200° C./hr, retention temperature: 1100° C., temperature retention time: 2 hours, cooling rate: 200° C./hr, oxygen partial pressure: $10^{-9}$ to $10^{-12}$ Pa, atmosphere: $H_2$—$N_2$—$H_2O$ mixed gas) to obtain a capacitor element main body.

Both end faces of the obtained capacitor element main body were applied with a Ag paste containing $B_2O_3$—$SiO_2$—BaO-based glass frit and subjected to a baking treatment (temperature: 800° C., atmosphere: $N_2$ gas) to obtain multilayer ceramic capacitors having the same shape as the multilayer ceramic capacitor illustrated in FIGURE. The sizes of the obtained multilayer ceramic capacitors were all 4.5 mm×3.2 mm×0.5 mm, the thickness of the dielectric layer was set to 6.0 µm, the thickness of the internal electrode layer was set to 1.5 µm, and the number of the dielectric layers interposed between the internal electrode layers was set to 5.

As for the obtained multilayer ceramic capacitors of Specimen No. 66 and Specimen No. 67, similarly to the example, the specific permittivity, the dielectric loss, the specific resistance, the DC voltage resistance, and the AC voltage resistance were measured and the results thereof were presented in Table 3.

TABLE 3

| | Main component composition | Accessory component [mol %] (with respect to 100 mol of main component) Mn | 25° C. Specific permittivity [−] | 25° C. Dielectric loss [%] | 200° C. Dielectric loss [%] | 200° C. Specific resistance [Ωcm] | 200° C. AC voltage resistance [V/µm] | 200° C. DC voltage resistance [V/µm] |
|---|---|---|---|---|---|---|---|---|
| ×Specimen No. 66 | $K(Sr_{0.3}Ba_{0.3}Ca_{0.4})_2Nb_5O_{15}$ | 40.00 | 1900 | 7.0 | 2.9 | 1.51E+09 | 42.2 | 134 |
| ×Specimen No. 67 | $K(Sr_{0.3}Ba_{0.3}Ca_{0.4})_2Nb_5O_{15}$ | 5.00 | 1900 | 6.0 | 2.7 | 9.56E+08 | 42.0 | 133 |

As presented in Table 3, it is possible to confirm that Specimen No. 66 and Specimen No. 67 that are a tungsten bronze type composite oxide containing an alkali metal element as a main component have low values of the voltage resistance and the specific resistance, and have a high value of the dielectric loss at 25° C., since a lattice defect caused by the alkali metal element with high volatility easily occurs and the conduction electron is easily generated.

INDUSTRIAL APPLICABILITY

The dielectric composition of the present invention can be applied under the environment close to an engine room as an in-vehicle electronic component since the dielectric composition has high DC voltage resistance, high AC voltage resistance, high specific resistance, and a low dielectric loss in a high-temperature region of 200° C., and can be also applied to use application as an electronic component mounted in the vicinity of a power device using a SiC- or GaN-based semiconductor.

EXPLANATIONS OF LETTERS OR NUMERALS

1 MULTILAYER CERAMIC CAPACITOR
2 DIELECTRIC LAYER
3 INTERNAL ELECTRODE LAYER
4 EXTERNAL ELECTRODE
10 CAPACITOR ELEMENT MAIN BODY

The invention claimed is:

1. A dielectric composition comprising, as a main component, a tungsten bronze type composite oxide represented by a chemical formula $((Sr_{1.00-(s+t)}Ba_sCa_t)_{6.00-x}R_x(Ti_{1.00-a}Zr_a)_{x+2.00}(Nb_{1.00-b}Ta_b)_{8.00-x}O_{30.00}$, wherein the R is at least one element selected from Y, La, Pr, Nd, Sm, Eu, Gd, Tb, Dy, Ho, Er, Tm, Yb, and Lu, and s, t, x, a, and b satisfy
$0.50 \leq s \leq 1.00$,
$0 \leq t \leq 0.30$,
$0.50 \leq s+t \leq 1.00$,
$1.50 < x \leq 3.00$,
$0.20 \leq a \leq 1.00$, and
$0 \leq b \leq 1.00$.

2. The dielectric composition according to claim 1, wherein at least one selected from Mn, Mg, Co, V, W, Mo, Si, Li, B, and Al is contained as a sub component in 0.10 mol or more and 20.00 mol or less with respect to 100 mol of the main component.

3. The dielectric composition according to claim 1, wherein a substitution amount a of Zr in the chemical formula is $0.50 \leq a \leq 1.00$.

4. A dielectric element comprising the dielectric composition according to claim 1.

5. An electronic component comprising a dielectric layer comprising the dielectric composition according to claim 1.

6. A multilayer electronic component comprising a multilayer portion wherein a dielectric layer comprising the dielectric composition according to claim 1 and an internal electrode layer alternately stacked.

* * * * *